Patented May 31, 1938

2,118,827

UNITED STATES PATENT OFFICE 2,118,827

METHOD OF MAKING QUINONE DI-IMIDES

Waldo L. Semon, Silver Lake, Ohio, assignor to The B. F. Goodrich Company, New York, N. Y., a corporation of New York No Drawing. Application October 13, 1937, Serial No. 168,752

12 Claims. (Cl. 260—56)

This invention relates to the art of manufacturing organic chemicals, and has for its object to provide an improved method for the manufacture of quinone di-imides from aromatic secondary amines.

Heretofore this reaction has been performed in solution, using an oxidizing agent such as an alkaline potassium permanganate solution. Some of the yield was always lost during the recovery and purification of the product.

In my parent application Serial No. 107,802, filed October 27, 1936, I describe and claim the oxidation of secondary aromatic diamines to produce diaryl quinone di-imides by exposure to the air in the presence of an alkali. I have also discovered that the compounds of heavy metals are catalysts for the reaction. The chlorides, bromides, iodides, oxides, hydroxides, stearates, oleates, sulfates, nitrates, acetates, carbonates, etc. of heavy metals such as lead, copper, nickel, iron, cobalt, cadmium, tin, antimony, and manganese are all catalysts for the reaction. Other compounds of other heavy metals may also be used. Where there are several possible compounds of the same metal such as litharge (PbO), lead dioxide (PbO₂) and red lead (Pb₃O₄), any one compound or a mixture of two or more give good results.

As a specific example of my invention, N,N'-di-beta naphthyl-para-phenylene diamine was ground with a small amount of sodium hydroxide and litharge, the mixture was then heated at a temperature of about 135° C. for about eight hours. The formation of N,N'-di-beta-naphthyl-para-benzoquinone di-imide, a brick red product melting above 345° C. is represented by the following:

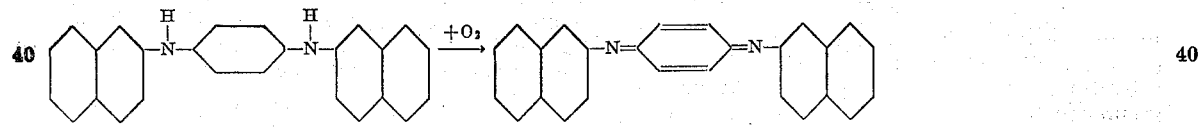

To perform the same reaction without a catalyst, the reaction mixture must either be heated longer or be ground or otherwise exposed to the air while being heated.

Heat is not essential to the reaction, especially when one of the catalysts of this invention is used. N,N'-diphenyl-p-phenylene diamine may be oxidized to N,N'-diphenyl-p-benzoquinone di-imide by merely grinding it in a mortar at room temperature with sodium hydroxide and cupric chloride. Other heavy metal compounds such as ferric chloride, cupric acetate, and nickel oxide, or indeed any of the compounds mentioned above are also good catalysts for this reaction.

A wide variety of secondary aromatic amines will undergo this reaction. Any secondary aromatic amine may be selected as the starting compound which falls in the class represented by the general formula:

where R is a radical selected from the class consisting of aryl, alkoxyaryl, and halogen-substituted aryl groups, and A is an arylene group capable of assuming a quinoid structure. By aryl, I mean any univalent aromatic hydrocarbon radical, as phenyl or tolyl, whose free valence belongs to the nucleus and not to a side chain. Whether the arylene group is capable of assuming a quinoid structure depends upon the relative position of the nitrogen atoms. For instance, the nitrogen atoms must be ortho or para to each other on a benzene nucleus and 1,2; 1,4; or 2,6 on a naphthalene nucleus.

To illustrate the wide application of this method, I will list some of the compounds which may be prepared by this reaction. Besides the two heretofore mentioned, these include: N,N'-diphenyl-o-benzoquinone di-imide; N,N'-di-iso-butyl-p-phenyl-p-benzoquinone di-imide; N,N'-di-p-xenyl-p-benzoquinone di-imide; N,N'-di-alpha - naphthyl - p - benzoquinone di - imide; N,N'-diphenyl-naphthaquinone (2,6) di-imide; N,N'-di-p-chlorphenyl-p-benzoquinone di-imide; N,N'-di-p-anisyl-p-benzoquinone di-imide; N,N'-diphenyl 2-phenyl-benzoquinone-(1,4) di-imide; N,N'-diphenyl tolu-p-quinone di-imide; and N,N'-diphenyl diphenoquinone-(4,4') di-imide. All of these compounds are valuable as antioxidants, as disclosed in my copending application, Serial No. 38,806, filed August 31, 1935.

This application is a continuation-in-part of my copending application Serial No. 107,802, filed October 27, 1936.

I claim:

1. The method of making quinone di-imides which comprises oxidizing in the air, in the presence of an alkali and a compound selected from the class consisting of oxides and salts of heavy metals, a secondary aromatic amine of the

formula, where R is a radical selected from the class consisting of aryl, alkoxyaryl, and halogen-substituted aryl groups, and A is an arylene group capable of assuming a quinoid structure.

2. The method of making quinone di-imides which comprises oxidizing in the air in the presence of an alkali and a heavy metal oxide a secondary aromatic amine of the

formula, where R is a radical selected from the class consisting of aryl, alkoxyaryl, and halogen-substituted aryl groups, and A is an arylene group capable of assuming a quinoid structure.

3. The method of making quinone di-imides which comprises oxidizing in the air in the presence of an alkali and litharge a secondary aromatic amine of the

formula, where R is a radical selected from the class consisting of aryl, alkoxyaryl, and halogen-substituted aryl groups, and A is an arylene group capable of assuming a quinoid structure.

4. The method of making quinone di-imides which comprises oxidizing in the air in the presence of an alkali and a heavy metal salt a secondary aromatic amine of the

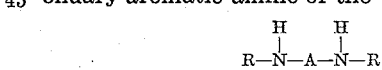

formula, where R is a radical selected from the class consisting of aryl, alkoxyaryl, and halogen-substituted aryl groups, and A is an arylene group capable of assuming a quinoid structure.

5. The method of making quinone di-imides which comprises oxidizing in the air in the presence of an alkali and a heavy metal halide a secondary aromatic amine of the

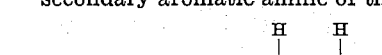

formula, where R is a radical selected from the class consisting of aryl, alkoxyaryl, and halogen-substituted aryl groups, and A is an arylene group capable of assuming a quinoid structure.

6. The method of making quinone di-imides which comprises oxidizing in the air in the presence of an alkali and a heavy metal chloride a secondary aromatic amine of the

R—N—A—N—R formula, where R is a radical selected from the class consisting of aryl, alkoxyaryl, and halogen-substituted aryl groups, and A is an arylene group capable of assuming a quinoid structure.

7. The method of making quinone di-imides which comprises oxidizing in the air in the presence of an alkali and ferric chloride, a secondary aromatic amine of the

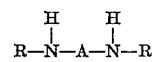

formula, where R is a radical selected from the class consisting of aryl, alkoxyaryl, and halogen-substituted aryl groups, and A is an arylene group capable of assuming a quinoid structure.

8. The method of making quinone di-imides which comprises oxidizing in the air in the presence of an alkali and cupric acetate a secondary aromatic amine of the

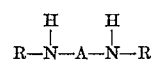

formula, where R is a radical selected from the class consisting of aryl, alkoxyaryl, and halogen-substituted aryl groups, and A is an arylene group capable of assuming a quinoid structure.

9. The method of making quinone di-imides which comprises heating in the air, in the presence of an alkali and a compound selected from the class consisting of oxides and salts of heavy metals, a secondary aromatic amine of the

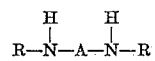

formula, where R is a radical selected from the class consisting of aryl, alkoxyaryl, and halogen-substituted aryl groups, and A is an arylene group capable of assuming a quinoid structure.

10. The method of making quinone di-imides which comprises grinding and heating in the air, in the presence of an alkali and a compound selected from the class consisting of oxides and salts of heavy metals, a secondary aromatic amine of the

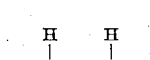

formula, where R is a radical selected from the class consisting of aryl, alkoxyaryl, and halogen-substituted aryl groups, and A is an arylene group capable of assuming a quinoid structure.

11. The method of making quinone di-imides which comprises oxidizing in the air, in the presence of an alkali and a compound selected from the class consisting of oxides and salts of heavy metals, a secondary aromatic amine of the

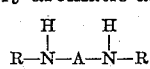

formula where R is an aryl group and A is an arylene group capable of assuming a quinoid structure.

12. The method of making N,N' diphenyl-p-benzoquinone di-imide which comprises grinding N,N' diphenyl-p-phenylene diamine in the air in the presence of an alkali and litharge.

WALDO L. SEMON.